United States Patent [19]

Lii

[11] Patent Number: 5,205,332
[45] Date of Patent: Apr. 27, 1993

[54] WIND-SHIELD BLIND

[76] Inventor: Jong Yi Lii, No. 17, Alley 160, Lane 164, Chungshan N. Rd., Yungkang Hsiang, Tainan Hsien, Taiwan

[21] Appl. No.: 892,339

[22] Filed: Jun. 2, 1992

[51] Int. Cl.$^5$ .............................................. E06B 9/08
[52] U.S. Cl. .................... 160/23.1; 160/370.2; 160/305; 160/323.1; 296/97.8
[58] Field of Search .............. 160/23.1, 26, 294, 301, 160/302, 305, 313, 323.1, 370.2, 304.1; 296/95.1, 97.7, 97.8

[56] References Cited

U.S. PATENT DOCUMENTS

| | | | |
|---|---|---|---|
| 1,621,972 | 3/1927 | Darby | 160/370.2 X |
| 2,561,188 | 7/1951 | Ferguson | 160/370.2 X |
| 2,589,609 | 3/1952 | Foster | 160/323.1 X |
| 4,335,773 | 6/1982 | Masi | 160/370.2 X |
| 4,707,018 | 11/1987 | Gavagan | 160/DIG. 3 |
| 4,762,358 | 8/1988 | Levosky et al. | 160/323.1 X |
| 4,823,859 | 4/1989 | Park | 160/370.2 |
| 4,869,542 | 9/1989 | Lin | 160/370.2 |
| 5,036,898 | 8/1991 | Chen | 160/370.2 X |
| 5,054,533 | 10/1991 | Lii | 160/23.1 X |

Primary Examiner—Blair M. Johnson
Attorney, Agent, or Firm—Fields, Lewis, Pittenger & Rost

[57] ABSTRACT

A wind-shield blind having a hollow spindle having a first end in which a tubular plug fits and a second end in which a second plug fits, a shaft inserted in the spindle through the tubular plug, a spring having a first end attached to a bifurcate end of the shaft and a second end attached to the tubular plug, a first terminal element connected with a flat end of the shaft, a second terminal element connected with the first terminal element by a connecting element, and a switch. The second plug has a ratchet from which a pole co-axially protrudes. The second terminal element has a wall surrounding a disk defining a slot, a ratchet, and a hole. The second plug is biased toward the second terminal element by the spring, thereby urging the ratchet of the second plug to engage with the ratchet of the second terminal element to retain an opaque film at any desired positions while the pole passes through the hole. A switch has a button from which a cylinder protrudes and defines a rim enclosing a smooth cavity. Two wedges laterally project from the cylinder of the switch and can be pressed through the slot, thereby allowing the switch to slid along the slot between a first position where the cavity contacts the pole, whereby the ratchets contact each other and a second position where the rim contacts the pole, whereby the ratchets are away from each other.

1 Claim, 4 Drawing Sheets 3,205,332

WIND-SHIELD BLIND

BACKGROUND OF THE INVENTION

The present invention relates to a wind-shield blind.

In the present inventor's U.S. Pat. No. 5,054,533, a wind-shield blind has a tube 2 functioning as a spindle for carrying an opaque plastic film 24. A plug 3 fits in a first end of the tube 2 while a plug 4 fits in a second end of the tube 2. A rod 5 is substantially inserted in the tube 2 through the plug 3. A spring 6 is securely attached to the plug 3 at a first end thereof and securely attached to a split end 51 of the rod 5 while a flattened end 50 of the rod 5 is received in an aperture 701 of a cap member 70. A curved cap member 9 is securely attached to the cap member 70 at a first end and securely attached to a cap member 71 at a second end. A toothed rim 41 of the plug 4 is biased to engage with a toothed rim 711 of the cap member 71 by the spring 6. Toothed rims 41 and 711 cooperate with each other to maintain the opaque plastic film 24 in any position. A major problem of this wind-shield blind is that the film 24 cannot be unscrolled from the tube 2 without making a clicking sound. The present invention is intended to solve this problem.

SUMMARY OF THE INVENTION

The present invention provides a wind-shield blind which includes a hollow spindle which has a first end in which a tubular plug fits and a second end in which a second plug fits, a shaft substantially inserted in the spindle through the tubular plug, a spring having a first end securely attached to a bifurcate end of the shaft and a second end securely attached to the tubular plug, a first terminal element securely connected with a flat end of the shaft, a second terminal element securely connected with the first terminal element by a connecting element, and a switch. The second plug has a ratchet from which a pole coaxially protrudes. The second terminal element has a wall surrounding a disk defining a slot, a ratchet, and a hole. The second plug is biased toward the second terminal element by the spring, thereby urging the ratchet of the second plug to engage with the ratchet of the second terminal element to retain an opaque film at any desired positions while the pole passes through the hole. A switch has a button from which a cylinder protrudes and defines a rim enclosing a smooth cavity. Two wedges laterally project from the cylinder of the switch and can be pressed through the slot, thereby allowing the switch to slide along the slot between a first position where the cavity contacts the pole, whereby the ratchets contact each other, and a second position where the rim contacts the pole, whereby the ratchets are away from each other. As a result, the opaque film can be unscrolled without making a clicking sound.

For a better understanding of the present invention and objects thereof, a study of the detailed description of the embodiments described hereinafter should be made in relation to the accompanying drawings.

DETAILED DESCRIPTION OF THE PREFERRED EMBODIMENT

Figure 1:
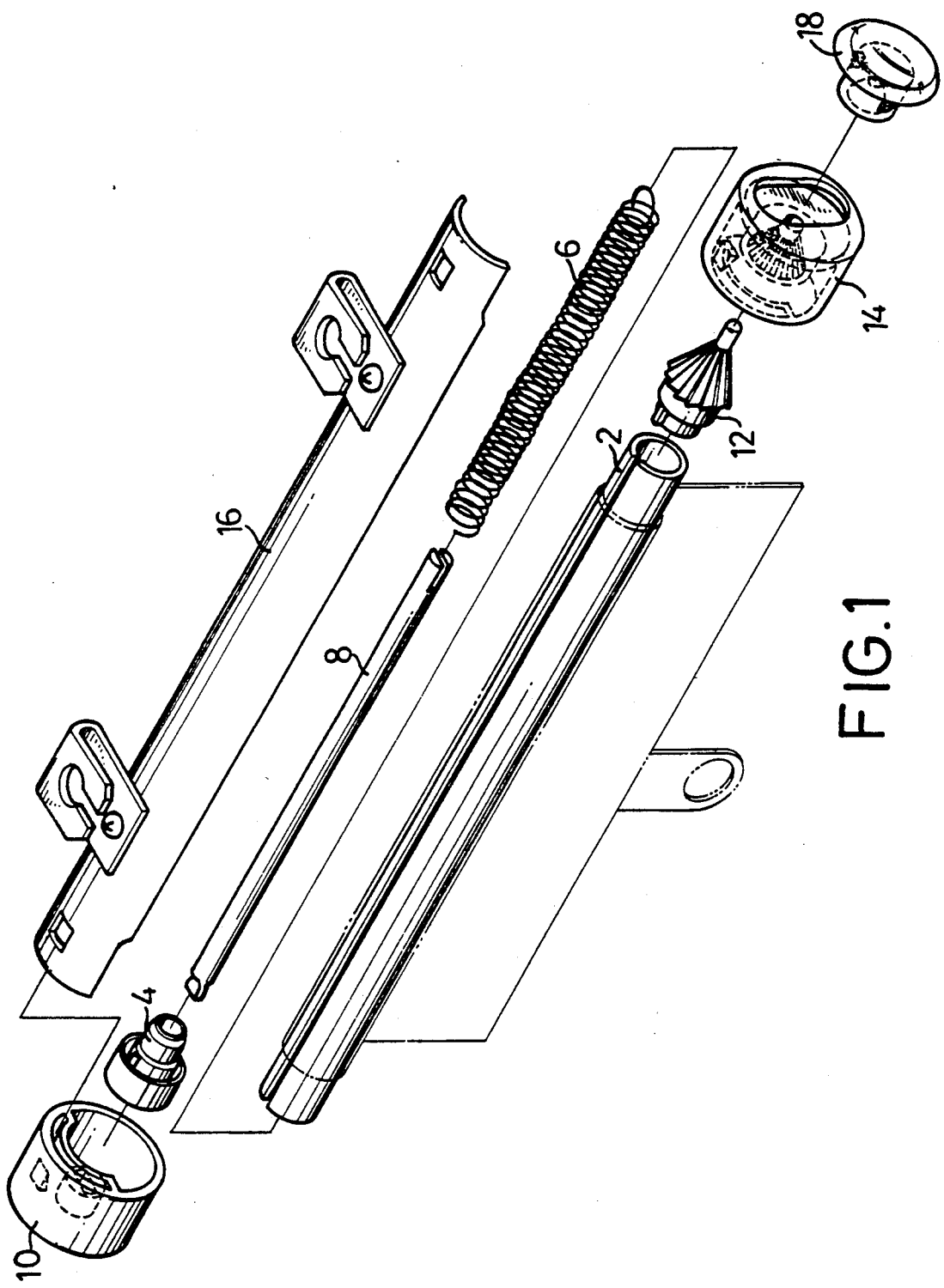
FIG. 1 is an exploded view of a first embodiment of a wind-shield blind in accordance with the present invention.

Referring to the drawings and, more particularly, to FIG. 1, a wind-shield blind in accordance with a first embodiment of the present invention is shown in an exploded view. As shown in phantom line, an opaque film has a free margin connected to a tab and a joint margin securely attached to a hollow spindle 2. The hollow spindle 2 is rolled from an elongated metal strip with two elongated edges between which a slot is thereby defined. The joint margin of the opaque film is inserted in the slot and clamped by the elongated edges, thereby attaching the opaque film to the hollow spindle 2. Initially, the opaque film is scrolled about the hollow spindle 2, so that the hollow spindle 2 is rotated when the opaque film is unscrolled therefrom.

A tubular plug 4 has a discretely tapered outer profile defining a thick section and a slender section. A spring 6 is securely attached to the slender section of the tubular plug 4 at a first end thereof and attached to a shaft 8 at a second end thereof. The shaft 8 has a flat end and a bifurcate end. In assembly, the bifurcate end of the shaft 8 is inserted in the spring 6 through the tubular plug 4 and attached to the second end of the spring 6 while the flat end is maintained beyond the tubular plug 4. The second end of the spring 6 is securely attached to the bifurcate end of the shaft 2. The tubular plug 4 fits in a first end of the hollow spindle 2 while a rib longitudinally extending on the thick section thereof is received in the slot of the hollow spindle 2, thereby restraining the hollow spindle 2 to rotate synchronously with the tubular plug 4. When the hollow spindle 2 is rotated relative to the shaft 8, through the tubular plug 4, the spring 6 is loaded with torque which rotates the hollow spindle 2 backwards when the hollow spindle 2 is released.

A first terminal element 10 consists of a circular plate and an outer wall surrounding the circular plate. An inner wall extends within the first terminal element 10 parallel to the outer wall of the first terminal element 10, thereby defining an arc-shaped groove. A wedge is formed on the outer wall within the arc-shaped groove of the first terminal element 10. A cylinder protrudes from an inner surface of the circular plate of the first terminal element 10 and defines a bore of a rectangular cross-section for receiving the flat end of the shaft 8, thereby maintaining the shaft 8 in a steady position relative to the first terminal element 10.

A second plug 12 has, at an end thereof, a male conical ratchet from which a pole co-axially extends and, at the other end thereof, a cylindrical portion on which a rib longitudinally extends. The cylindrical portion of the second plug 12 fits in a second end of the hollow spindle 2 while the rib of the second plug 12 is received in the slot of the hollow spindle 2, thereby restraining the hollow spindle 2 to rotate synchronously with the second plug 12. Similar to the first terminal element 10, a second terminal element 14 consists of a circular plate formed with a slot and an outer wall surrounding the circular plate. An inner wall extends parallel to the outer wall within the second terminal element 14, thereby defining an arc-shaped groove. A wedge is formed on the outer wall within the arc-shaped groove of the second terminal element 14. A partition is formed within the second terminal element 14 parallel to the circular plate of the second terminal element 14. From the partition extends a cylinder defining a female conical ratchet from which a hole co-axially extends through the partition.

An elongated shell 16 of an arc-shaped cross-section corresponding to the arc-shaped grooves of the terminal elements 10 and 14 has two ends each formed with a hole. One end of the shell 16 is received in the arc-shaped groove of the first terminal element 10 while the wedge of the first terminal element 10 is inserted through the hole of the shell 16 and the other end of the shell 16 is received in the arc-shaped groove of the second terminal element 14 while the wedge of the second terminal element 14 is inserted through the hole of the shell 16, thereby securely connecting the first terminal element 10 and the second terminal element 14 with the shell 16.

A switch 18 consists of a button from which a cylinder protrudes. The cylinder defines a peripheral rim enclosing a smooth cavity and two wedges laterally projecting therefrom to thereby allow the switch to slide along the slot after the wedges are pressed through the slot of the second terminal element 14.

A plurality of suckers are securely attached to the shell 16 for attaching the wind-shield blind to a wind-shield or a plurality of hooks are securely attached to the shell 16 in order to attach the wind-shield blind to an upper rim of a window of a vehicle (not shown). As the wind-shield blind is conventionally attached to a wind-shield or a window, further description thereof is not necessary.

Figure 2:
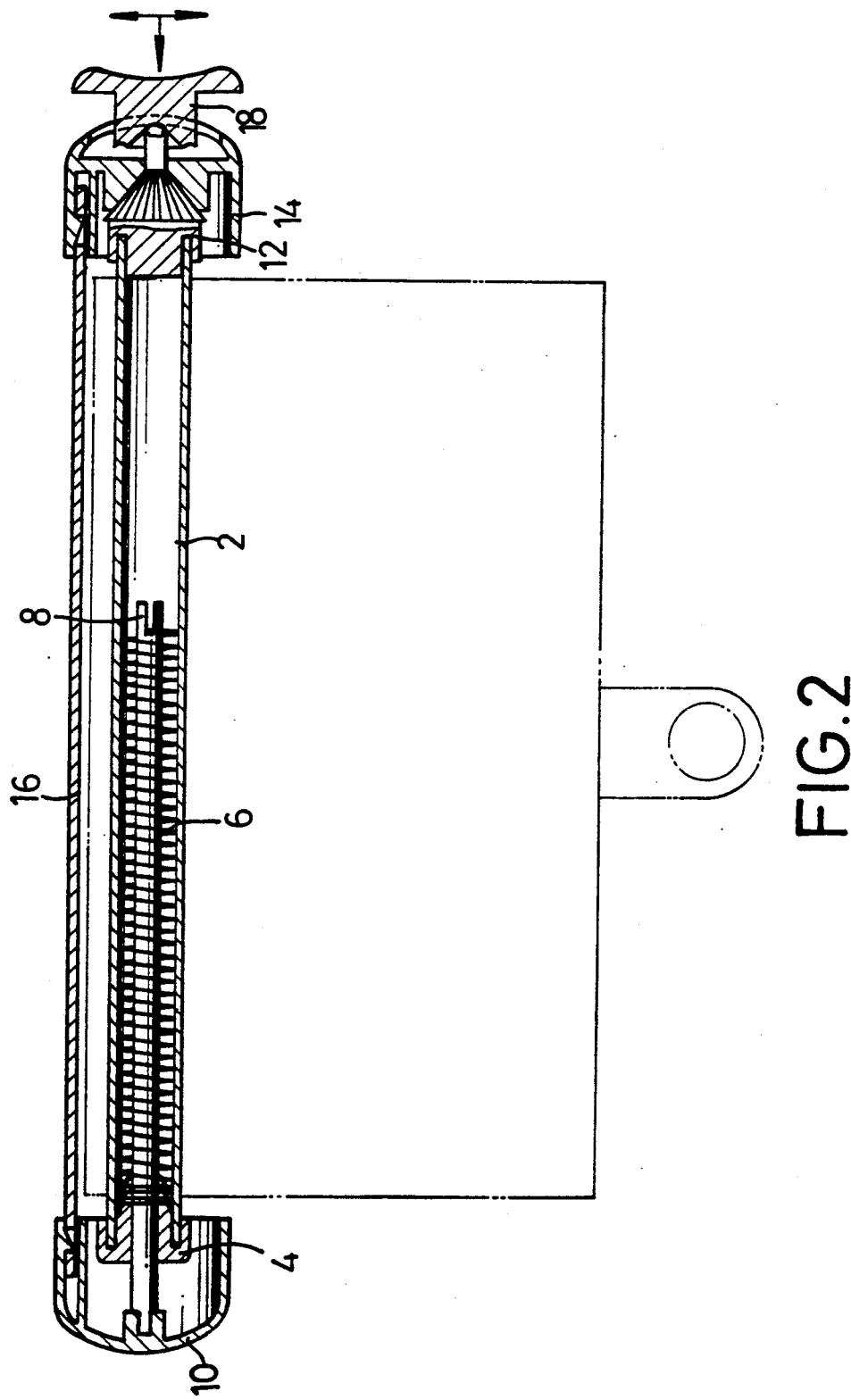
FIG. 2 is a cross-sectional view of a wind-shield blind in accordance with the present invention, showing a male conical ratchet engaged with a female conical ratchet.

Referring to FIG. 2, the wind-shield blind in accordance with the first embodiment of the present invention is shown in a cross-sectional view. The shell 16 is steady relative to the vehicle. Consequently, terminal elements 10 and 14 and the shaft 8 are steady relative to the vehicle. The spring 6, as a tensional spring, urges the male conical ratchet of the second plug 12 to engage with the female conical ratchet of the second terminal element 14 while the pole of the second plug 12 makes contact with the smooth cavity of the switch 18.

If a sufficient torque is exerted on the second plug 12 so as to overcome the tensional force of the spring 6, the male conical ratchet will be disengaged from the female conical ratchet, i.e., the male conical ratchet will rotate relative to the female conical ratchet. To unscroll the opaque film, a sufficient force is exerted on the tab, thereby introducing a sufficient torque to the hollow spindle 2. Therefore, the male conical ratchet is urged to rotate relative to the female conical ratchet, thereby allowing the hollow spindle 2 to rotate relative to the shaft 8. As a result, the spring 6 is loaded with a torque through the tubular plug 4. The spring 6 urges the male conical ratchet to engage with the female conical ratchet when the opaque film is released to thereby retain the opaque film in any desired position.

Figure 3:
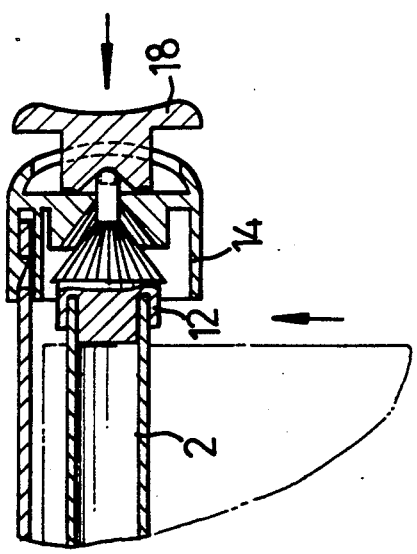
FIG. 3 is a fragmental cross-sectional view of a wind-shield blind in accordance with the present invention, showing a male conical ratchet disengaged from a female conical ratchet, thereby allowing an opaque film to be scrolled.

Referring to FIG. 3, the switch 18 is pressed toward the first terminal element 10, thereby disengaging the male conical ratchet of the second plug 12 from the female conical ratchet of the second terminal element 14 and thereby allowing the spring 6 to rotate the hollow spindle 2 backwards, thereby scrolling the opaque film.

Figure 4:
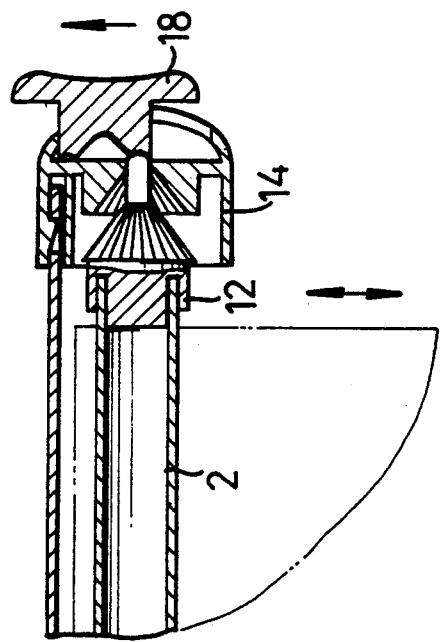
FIG. 4 is a fragmental cross-sectional view of a wind-shield blind in accordance with the present invention, showing a switch urging a male conical ratchet to disengage from a female conical ratchet, thereby allowing an opaque film to be unscrolled without the male conical ratchet contacting the female conical ratchet.

Referring to FIG. 4, the switch 18 is switched to a topmost position, where the rim of the cylinder of the switch 18 urges the pole of the second plug 12 so as to disengage the male conical ratchet of the second plug 12 from the female conical ratchet of the second terminal element 14. Thus, the opaque film can be unscrolled from the hollow spindle 2 without the impediment caused by the male conical ratchet and the female conical ratchet, i.e., without making a clicking sound.

Figure 5:
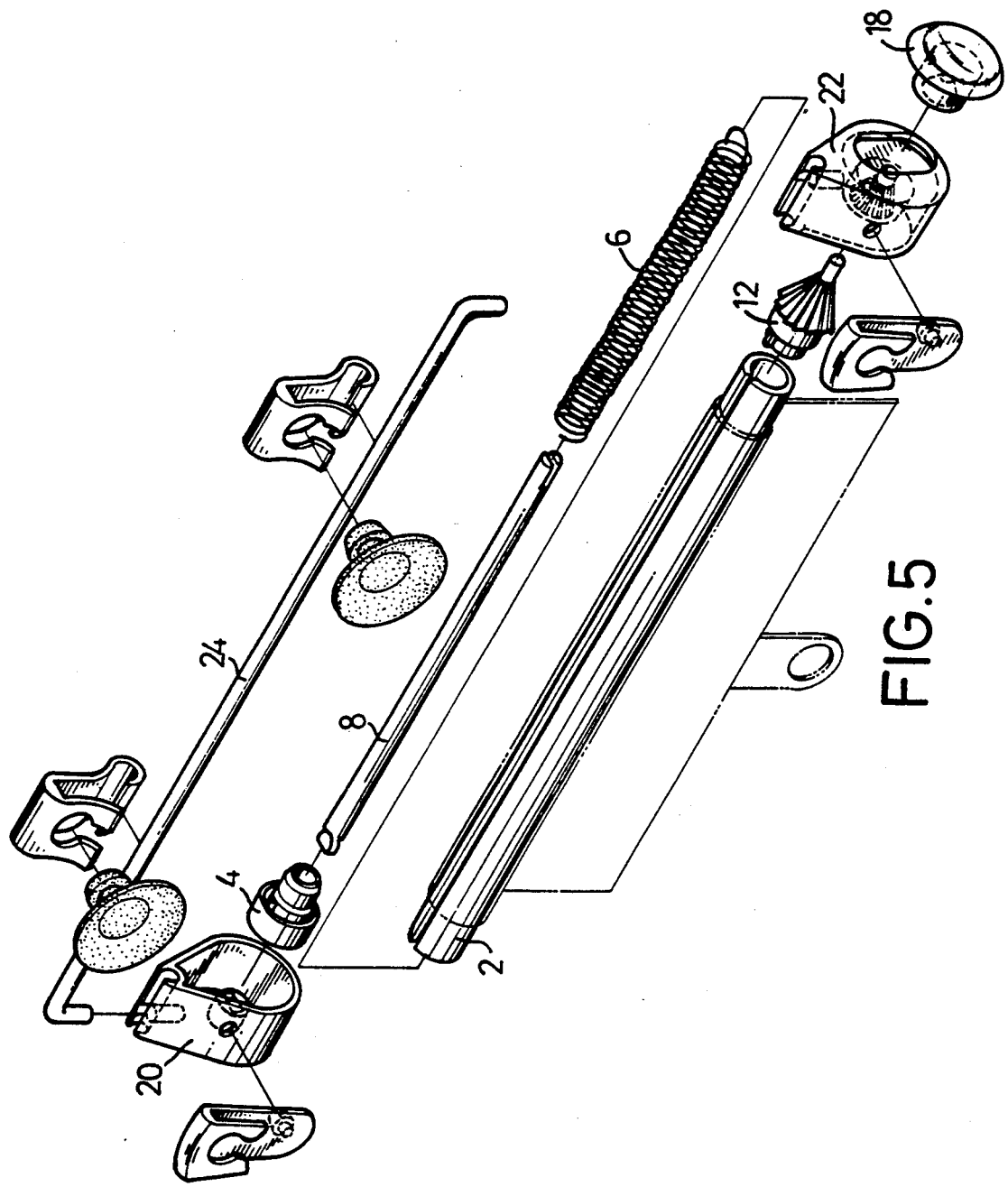
FIG. 5 is an exploded view of a wind-shield blind in accordance with a second embodiment of the present invention.

Referring to FIG. 5, a wind-shield blind in accordance with a second embodiment of the present invention is shown in an exploded view. As shown in FIGS. 1 and 5, elements indicated by the same numerals are the same. However, the wind-shield blind in accordance with the second embodiment of the present invention has a first terminal element 20, a second terminal element 22, and a bar 24.

The element 20 consists of a teardrop-shaped plate and a wall surrounding the teardrop-shaped plate. A cylinder protrudes from the teardrop-shaped plate of the first terminal element 20 and defines a bore of a rectangular cross-section for receiving the flat end of the shaft 8. Along the wall a channel extends and transversely communicates with a bore.

The second terminal element 22 consists of a teardrop-shaped plate and a wall surrounding the teardrop-shaped plate. A partition is formed in the second terminal element 22 parallel to the teardrop-shaped plate. From the partition extends a cylinder defining a female conical ratchet from which a hole extends through the partition of the second terminal element 22. The teardrop-shaped plate of the second terminal element 22 defines a slot along which the cylinder of the switch 18 slides. A channel extends along the wall and transversely communicates with a bore.

The bar 24 has two ends extending perpendicular therefrom. One end of the bar 24 is received in the bore of the first terminal element 20 and the bar 24 is received in the channel of the first terminal element 20 while the other end of the bar 24 is received in the bore of the second terminal element 22 and the bar is received in the channel of the second terminal element 22, thereby securely connecting the first terminal element 20 with the second terminal element 22.

It should be noted that the male conical ratchet of the second plug 12 can be replaced by a surface ratchet while the female conical ratchet of the second terminal element can also be replaced by a surface ratchet, whereby the surface ratchets coincide with each other. Furthermore, the male conical ratchet of the second plug 12 can be replaced by a toothed rim while the female conical ratchet of the second terminal element can also be replaced by a toothed rim, as those taught by the present inventor's above-mentioned U.S. patent.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A wind-shield blind comprising a hollow spindle which carries an opaque film having a first end in which a tubular plug fits and a second end in which a second plug fits, a shaft substantially inserted in the spindle through the tubular plug, a spring securely attached to a bifurcate end of the shaft at an end and securely attached to the tubular plug at the other end, a first terminal element to which a flat end of the shaft is securely attached, and a second terminal element securely connected to the first terminal element by a connecting element, the improvement comprising:

said second plug having a ratchet from which a pole coaxially protrudes;

said second terminal element having a wall surrounding a disk defining a slot, a ratchet cooperating with said ratchet of said second plug for maintaining the opaque film at any desired position, and a hole through which said pole protrudes;

a switch having a button, a cylinder protruding from said button and defining a rim enclosing a smooth cavity, and two wedges laterally projecting from said cylinder and being pressable through said slot, thereby restricting said switch to slide along said slot between a first position where said pole contacts said cavity, whereby said ratchets contact each other and a second position where said pole contacts said rim, whereby said ratchets are away from each other.

* * * * *